United States Patent Office 3,578,399
Patented May 11, 1971

---

3,578,399
PRODUCTION OF CRYSTALLINE POTASSIUM SULFATE
Albert F. Boeglin, Carlsbad, N. Mex., assignor to International Minerals & Chemicals Corporation
No Drawing. Filed Oct. 23, 1968, Ser. No. 770,069
Int. Cl. C01d 5/10
U.S. Cl. 23—121                    7 Claims

ABSTRACT OF THE DISCLOSURE

The metathetical reaction of langbeinite with potassium chloride to produce crystalline potassium sulfate proceeds slowly and with considerable foaming when a small amount of surface active agent has been added for the purpose of increasing the average size of the potassium sulfate crystals. The reaction can be made to proceed to completion more quickly and foaming can be controlled by adjusting the pH of the reaction mixture at a time when the reaction has proceeded about 35% to about 50% to completion. The pH is adjusted from an initial value of about 7 to a value between 2 and 6 by addition of acid.

---

Complex salts containing magnesium sulfate and potassium sulfate occur naturally in many potash ores, such as the potash ores that are found in the European deposits and in the Permian Basin of the southwest area of the United States, and mined chiefly in the Carlsbad district of New Mexico. Such complex salts may also be recovered from brines and may be prepared from potash compounds. It is frequently desirable to separately recover the potassium values and/or magnesium values from these complex salts and many processes to effect the separation have been developed. Examples of such complex salts are langbeinite, leonite and schoenite.

The potassium values in langbeinite ores, for example, are recovered by reacting langbeinite (with or without previous splitting of langbeinite to leonite or schoenite) with an aqueous solution of potassium chloride to produce potassium sulfate. Potassium sulfate crystals form in the solution and are recovered. The potassium sulfate mother liquor may be processed by one or another procedure to recover the magnesium values therefrom. This prior process for the preparation of potassium sulfate from complex salts containing magnesium sulfate and potassium sulfate is commercially practiced. Other rather similar processes are known for the production of potassium sulfate from leonite and schoenite.

While such processes have found commercial acceptance, the potassium sulfate product is of relatively fine size. That is, the crystals of potassium sulfate formed are small. For many purposes, however, small size particles of potassium sulfate are undesirable. For example, in the manufacture and utilization of fertilizers, which frequently include potassium sulfate, the use of such materials in finely divided form gives rise to caking and dusting problems so that granular materials are distinctly preferred, and the demand therefor has greatly expanded in recent years. A need has therefore existed for a method of preparing potassium sulfate in granular form, or in relatively large crystal form, so that it would be directly available to the market without any necessity for preparing it first in finely divided form and then converting it into a larger form by granulation, compaction, briquetting, or other agglomerating methods.

United States Patent No. 3,271,106 describes a process for the reaction of a complex magnesium-potassium sulfate salt with potassium chloride in the presence of a small amount, ordinarily 50–250 parts per million, of a selected surface-active agent, whereby the crystal size of the product potassium sulfate is greatly increased. In accordance with one example of this patent it has been possible to increase the percent of crystals retained on a 28 mesh screen from less than 1% of the product to more than 65% of the product. In accordance with another example, it is possible to increase the +48 mesh portion of the product from about 11% to about 62%. In accordance with yet another example it is possible to increase the percent of the product which is +65 mesh to 96%.

This increase in crystal size is, however, accompanied by a decrease in the reaction rate. It has been observed, for example, that under conditions where the reaction might go to completion in 3 hours, the presence of a selected surfactant necessary to achieve the desired product crystal size reduces the reaction rate to a point at which the reaction is still incompleted after 10 or more hours. Further, the reaction is characterized by excessive foaming. It has now been found that by proper control of the pH of the reaction medium, it is possible to achieve the improved crystal size contemplated by the aforementioned patent while maintaining the rate of reaction at a tolerable level and with the further advantage that foaming is controlled.

It is an object of the present invention to provide an improved method for the preparation of potassium sulfate by the reaction of potassium chloride with a solid potassium-magnesium double sulfate.

It is a further object of the present invention to provide an improved process for the production of potassium sulfate from langbeinite, in which the potassium sulfate is recovered in relatively large crystal size.

Yet another object is to provide an improved process for the production of potassium sulfate from a complex potassium-magnesium sulfate salt, in which the potassium sulfate is recovered in relatively large crystals while the reaction rate is maintained at a satisfactory level for commercial operations, while foaming is controlled to acceptable levels. These and other objects of the present invention will be apparent to those skilled in the art as the description of the present invention progresses.

Generally described, the present invention is an improvement in the process for the production of potassium sulfate crystals by the reaction of potassium chloride with a complex salt of magnesium-potassium sulfate in an aqueous medium, and in the presence of a minor amount of a surface-active agent effective to substantially increase the size of the potassium sulfate crystals produced. The improvement comprises carrying out the reaction under controlled conditions such that the pH of the aqueous reaction medium, at a point in the process at which the reaction is about 35% to 60% completed, is lowered from an initial pH of at least about 7 to a pH between 2 and 6.

As hereinbefore set forth, complex salts containing magnesium potassium sulfate occur naturally in many potash ores. Examples of the complex salts contemplated as starting materials in the process of this invention are the potassium magnesium double sulfates, langbeinite ($2MgSO_4 \cdot K_2SO_4$), leonite ($MgSO_4 \cdot K_2SO_4 \cdot 4H_2O$), and schoenite ($MgSO_4 \cdot K_2SO_4 \cdot 6H_2O$). These complex salts may be utilized in pure or impure form, with the higher grades or purities being preferred.

The reaction of these complex salts with potassium chloride is effected in an aqueous medium. However, it is necessary that solid salts, such as substantially dry complex salts, be admixed with the potassium chloride. Solid mixtures of two or more of the complex salts may be used in the process of this invention. The complex salts are used in solid form and they are preferably in subdivided form smaller than 20 mesh, more preferably smaller than 100 mesh, and still more preferably at least 95% smaller than 200 mesh. The solid complex salts may, of course, be slurried in water or other aqueous solution, preferably a brine, before admixing with the potassium chloride. The complex salt is used as a solid since it is desirable to maintain the amount to mother liquor from which the reaction product, potassium sulfate, is removed as low as possible.

Although in initiating the process only potassium chloride is used in the reaction mixture with the langbeinite or other double sulfate of potassium-magnesium, and the brine, a slurry of recycled potassium salts, recovered from the mother liquor of the product, is preferably present in the reaction mixture and is employed once the process has been initiated. Potassium values present in the mother liquor from which the potassium sulfate product is separated are recovered as a mixture of leonite $$(K_2SO_4 \cdot MgSO_4 \cdot 4H_2O)$$

and potassium chloride.

The process is initiated by admixing the solid complex salt, preferably langbeinite, and potassium chloride with an aqueous solution, which is preferably a brine, substantially saturated with respect to potassium chloride. A potassium sulfate crystal product is formed and separated from the resultant mixture.

As hereinbefore set forth when a specified surface-active agent is present in the reaction mixture, the resultant potassium sulfate is of substantially larger average crystal size. It is significant that the amount of the +65 mesh size crystals is significantly increased. Accordingly, the process is affected by the presence of the surface-active agent. It is, of course, necessary that the agent be present during the reaction of langbeinite with the potassium chloride. The neutralized agent is introduced into the reaction zone in any suitable manner. For example, the neutralized agent may be admixed with the langbeinite, it may be admixed with brine introduced into the reaction zone, it may be admixed with the potassium chloride, or it may be introduced directly into the reaction zone. Surface-active agents which are described in the aforementioned application for patent as capable of substantially enhancing the crystal size of the product potassium sulfate are the sodium, potassium and magnesium salts of acid sulfates and sulfonic acids of oleic acid, stearic acid, lauric acid, valeric acid, palmitic acid, capric acid, caproic acid, caprilic acid, heptylic acid, and sylvic acid. The following specific compounds, not within the aforedefined class, are also useful in accordance with this invention. These compounds are triethanol amine oleic acid sulfonate, disodium 4-dodecylated oxydibenzene sulfonate, and sodium dodecyl benzene sulfonate. Mixtures of the compounds defined individually or by class may be used.

Examples of specific compounds within the aforedefined class which are useful in accordance with this invention are:

SODIUM SALTS

Sodium oleic acid sulfonate
Sodium stearic acid sulfonate
Sodium lauric acid sulfonate
Sodium valeric acid sulfonate
Sodium palmitic acid sulfonate
Sodium capric acid sulfonate
Sodium caproic acid sulfonate
Sodium caprilic acid sulfonate
Sodium heptylic acid sulfonate
Sodium sylvic acid sulfonate
Sodium oleic acid sulfate
Sodium stearic acid sulfate
Sodium lauric acid sulfate
Sodium valeric acid sulfate
Sodium palmitic acid sulfate
Sodium capric acid sulfate
Sodium sylvic acid sulfate

POTASSIUM SALTS

Potassium oleic acid sulfonate
Potassium stearic acid sulfonate
Potassium lauric acid sulfonate
Potassium valeric acid sulfonate
Potassium palmitic acid sulfonate
Potassium capric acid sulfonate
Potassium caproic acid sulfonate
Potassium caprilic acid sulfonate
Potassium heptylic acid sulfonate
Potassium sylvic acid sulfonate
Potassium oleic acid sulfate
Potassium stearic acid sulfate
Potassium lauric acid sulfate
Potassium valeric acid sulfate
Potassium palmitic acid sulfate
Potassium capric acid sulfate
Potassium sylvic acid sulfate

MAGNESIUM SALTS

Magnesium oleic acid sulfonate
Magnesium stearic acid sulfonate
Magnesium lauric acid sulfonate
Magnesium valeric acid sulfonate
Magnesium palmitic acid sulfonate
Magnesium capric acid sulfonate
Magnesium caproic acid sulfonate
Magnesium caprilic acid sulfonate
Magnesium heptylic acid sulfonate
Magnesium sylvic acid sulfonate
Magnesium oleic acid sulfate
Magnesium stearic acid sulfate
Magnesium lauric acid sulfate
Magnesium valeric acid sulfate
Magnesium palmitic acid sulfate
Magnesium capric acid sulfate
Magnesium sylvic acid sulfate The reaction is permitted to proceed until it is about 35% to 60% completed, preferably 40% to 50% complete. That is, 35% to 60% of the solid langbeinite (or other complex salt) has entered the solution. The stage of the reaction may readily be determined by removing a small sample of the aqueous phase of the reaction medium and measuring, by conventional analytical techniques, the magnesium ion concentration of this liquor. For example, the starting magnesium ion concentration of the liquor can be determined (particularly where a recycled liquor is employed) and a final magnesium ion concentration can be determined after the reaction has gone to completion as evidence by the total absence of langbeinite solids. Thereafter the reaction can be repeated and the percent of completion at any time can be determined by measuring the magnesium ion concentration of a liquor sample and performing the obvious calculations. It has been found that the reaction, when carried out under typical prior art conditions, will reach 35% to 60% completion after about 4–7 hours have elapsed.

In carrying out the process of this invention, when it has reached the appropriate stage of 35% to 60% completion, more preferably 40% to 50% completion, the pH of the aqueous reaction medium is adjusted from its initial value of at least pH 7 (sometimes substantially higher than 7, depending upon the quantity of surface-active agent employed) to a pH between 2 and 6, and more preferably between 4 and 5.6. This adjustment of the pH is readily accomplished by the addition of a small amount of acid. Any mineral acid may be used. The addition of hydrochloric acid or sulfuric acid is particularly preferred for reasons of economy and because the use of such acids does not introduce to the reaction medium an ion not already present in the reaction medium, i.e., a contaminant. However, nitric acid, phosphoric acid, hydrofluoric acid, or any other mineral acid may be used.

It has been found that by adjusting the pH to a value of about 2 to 6 at the appropriate reaction stage, the rate of reaction is substantially enhanced without significantly altering the crystal size of the product and the production of foam is effectively controlled. The reaction will ordinarily go to substantial completion within about an hour of the pH adjustment, whereby the total reaction time is reduced to 6–7 hours, as compared to the 10 hours or more which would otherwise be required. It will be understood that the reaction rate depends upon many conditions. Depending upon these conditions, without adjustment of pH in accordance with this invention, the total time required to complete the reaction may be as little as 6 hours or as long as up to 12 hours. For any given set of conditions, however, if pH is adjusted in accordance with this invention, the time required for the reaction to proceed to completion will be reduced. This reduced reaction time, however, will not always be less than the reaction time required without pH adjustment but under different reaction conditions.

The stage of reaction at which pH adjustment is made, however, is critical. Lowering the pH to a value below 6 before the reaction has reached at least about 35% completion has a decided adverse effect upon crystal growth. The advantageous increase in the product crystal size realized by use of a surface-active agent is thereby in part nullified. On the other hand, delaying the lowering of the pH until the process has exceeded about 60% completion unnecessarily lengthens the total time required for the reaction to reach substantial completion.

Where the process is carried out on a batch basis, the pH is lowered to an appropriate value below 6 by the addition of a mineral acid at a time when the reaction is between 35% and 60% complete as indicated by prior experience or by analysis of the magnesium content of the aqueous medium as before described. Where the process is carried out on a continuous basis, as is preferred, it is customary to employ a series of reaction vessels through which the reaction medium passes and which provides adequate retention time for the completion of the reaction. In this instance, the design of the reaction vessels, e.g., their capacity in relation to the flow rate of the reaction medium, is such as to provide a retention time in a first vessel or first set of vessels sufficient to permit the reaction to reach 35% to 60% completion. The second vessel or second set of vessels has a capacity sufficient to provide a retention time adequate for the completion of the reaction. Ordinarily a retention time of one hour is satisfactory for the second vessel or series of vessels. The initial pH of at least 7 is maintained in the first vessel or series of vessels, acid being added to the second vessel or series of vessels as required to lower the pH therein to a value of 6 or lower.

The process of this invention is illustrated by the following examples in which potassium chloride was dissolved in water at the indicated temperature, the surface-active agent added in the amount indicated, and then finely divided langbeinite (95% −200 mesh) was added. The reaction temperature was controlled at a desirable level in accordance with the prior art, the solid crystals formed were recovered by filtration, washed with water and methanol, dried, screened, weighed and analyzed by size fraction. Liquor samples analyzed for magnesium ion concentration were taken periodically. The percent magnesium in the liquor is indicative of the percent completion of the reaction. The ratio of potassium chloride to langbeinite and water was such that at 100% completion the magnesium ion content of the liquor would be between 2.8 and 2.9 percent.

Example I

Reactants: 1050 grams KCl in 3000 cc. $H_2O$, 3.0 cc. of sodium oleic acid sulfonate, 1040 grams langbeinite Reaction temperature—45–55° C.:
  Percent Mg at 1 hour from start in liquor ____ 0.33
  Percent Mg at 3.5 hours from start in liquor __ 0.59
  Percent Mg at 6.0 hours from start in liquor __ 1.17
Hydrochloric acid added at 6.0 hours to bring pH to below 4:
  Percent Mg at 6.5 hours from start _____ 2.54

| | Analyses of solids | | Screen analyses of solids | |
|---|---|---|---|---|
| | +200 M | −200 M | Mesh | Percent cum |
| Percent $K_2O$ | 52.46 | 25.23 | +28 | 14.5 |
| Percent Mg | 0.50 | 9.75 | 35 | 42.0 |
| Percent Cl | 0.13 | 0.08 | 48 | 76.5 |
| | | | 65 | 83.5 |
| | | | 100 | 85.1 |
| | | | 200 | 86.0 |
| | | | −200 | 14.0 |

Example II

Reactants: 1050 grams KCl in 3000 cc. $H_2O$, 2.5 cc. sodium oleic acid sulfonate, 1040 grams langbeinite.

Reaction temperature—45–55° C., no acid added, total reaction time 7 hours:
  Mg in liquor at 1 hour _____ 0.58
  Mg in liquor at 5 hours _____ 1.60
  Mg in liquor at 6 hours _____ 1.68
  Mg in liquor at 7 hours _____ 1.80
Solids—percent cum +65 _____ 49.3

| Analyses | +65 M | −65 M |
|---|---|---|
| Percent $K_2O$ | 51.84 | 22.90 |
| Percent Mg | 0.71 | 11.07 |
| Percent Cl | 0.12 | 0.04 |

Total percent of langbeinite unreacted and present in −65 mesh=41.95%

Example III

Reactants: 1050 grams KCl, 3000 grams $H_2O$, 2.5 cc. sodium oleic acid sulfonate, 1040 grams langbeinite.

Reaction temperature—45–55° C., hydrochloric acid added at 6 hours, total reaction time 7 hours:
  Mg in liquor at 1 hour _____ 0.50
  Mg in liquor at 5 hours _____ 1.48
  Mg in liquor at 6 hours _____ 1.59
  Mg in liquor at 7 hours _____ 2.97
Solids—percent cum +65M _____ 88.2

| Analyses | +65 M | −65 M |
|---|---|---|
| Percent $K_2O$ | 52.68 | 26.32 |
| Percent Mg | 0.52 | 6.93 |
| Percent Cl | 0.08 | 0.04 |

Percent of langbeinite unreacted and present in −65 mesh=5.7%

It will be apparent from an examination of Examples I and III, particularly in comparison with Example II, that the addition of acid to lower the pH of the reaction medium has a decided beneficial effect upon the rate of reaction. It will further be seen by a comparison of Examples I and II that the rate of reaction is inversely proportional to the quantity of surface-active agent employed.

The effect of the pH reduction in the control of foaming was demonstrated by placing synthetic potassium sulfate mother liquor as employed in Examples I to III inclusive in a 1000 cc. graduated cylinder, adding surfactant as specified, and bubbling air through the solution to simulate the foam which occurs in actual plant-scale operations. The height of the foam and the time required for the foam to dissipate was measured.

Example IV

Mother liquor in the amount of 500 cc. was flowed in the cylinder, and the indicated amount of sodium oleic acid sulfonate surfactant was added. The pH of the mixture was adjusted to the stated value using hydrochloric acid or caustic soda. Air was bubbled through the column for 30 seconds, and the quantity of foam produced and the time required for it to dissipate were measured.

| Surfactant, cc. | pH | Height of foam (inches) | Time to dissipate (seconds) |
|---|---|---|---|
| None | 8 | 10.5 | 15 |
| Do | 6 | 5.5 | 10 |
| ½ | 8 | 10.5 | 80 |
| ½ | 6 | 10.5 | 50 |
| ½ | 2 | 0 | 0 |
| ½ | 2 | 0 | 0 |

Example V

The experiment of Example IV was repeated, but using only 200 cc. of mother liquor.

| Surfactant, cc. | pH | Height of foam (inches) | Time to dissipate (seconds) |
|---|---|---|---|
| None | 10 | 14.5 | 30 |
| Do | 8 | 7 | 25 |
| 0.1 | 10 | 14.5 | 80 |
| 0.1 | 8 | 14.5 | 55 |
| 0.1 | 5 | 0 | 0 |
| 0.1 | 4.5 | 0 | 0 |
| 0.1 | 4.0 | 0 | 0 |

Example VI

The experiment of Example V was repeated, but using as surfactant disodium 4-dodecylated oxydibenzene sulfonate.

| Surfactant, cc. | pH | Height of foam (inches) | Time to dissipate (seconds) |
|---|---|---|---|
| None | 10 | 14.5 | 30 |
| 0.1 | 10 | 14.5 | >300 |
| 0.1 | 8 | 14.5 | >240 |
| 0.1 | 5 | 14.5 | 180 |
| 0.1 | 4 | 14.5 | 60 |
| 0.1 | 2 | 14.5 | 60 |

It is apparent from the foregoing data that pH has a significant effect upon foaming, and that substantial control is obtained between pH 6 and pH 2.

While the invention has been described with emphasis upon the preferred embodiments thereof, and has been illustrated by specific examples, it will be understood that within the scope of the appended claims the invention can be practiced other than as specifically described.

The embodiments of the invention in which an exclusive property or privilege is claimed are defined as follows:

1. In a process for the production of potassium sulfate crystals by the reaction of potassium chloride with a complex salt of magnesium-potassium sulfate in aqueous medium and in the presence of a minor amount of a surface-active agent effective to substantially increase the average size of said potassium sulfate crystals, the improvement comprising adjusting the pH of the aqueous reaction medium at a point in the process at which the reaction is about 35%–60% complete from an initial pH of at least about 7 to a pH of about 2 to 6 by the addition of a mineral acid.

2. The method in accordance with claim 1 in which said acid is sulfuric acid or hydrochloric acid.

3. The method in accordance with claim 1 in which said complex salt comprises langbeinite.

4. The method in accordance with claim 3 in which the pH is adjusted to a value less than about 5.6.

5. The method in accordance with claim 4 in which said reaction is about 40% to 50% complete at the time said pH is adjusted.

6. The method in accordance with claim 5 in which said pH is adjusted by the addition of hydrochloric acid or sulfuric acid to the reaction medium.

7. The method in accordance with claim 6 in which said surface-active agent is disodium 4-dodecylated oxydibenzene sulfonate.

References Cited

UNITED STATES PATENTS 2,295,257 9/1942 Butt et al. ............. 23—121
3,271,106 9/1966 Nylander ............. 23—121

OTHER REFERENCES

Mellor, J. W.: A Comprehensive Treatise on Inorganic and Theoretical Chemistry; vol. II; Longmans, Green and Co., N.Y., 1922, pp. 659–60.

Jones, W. N.: Inorganic Chemistry; The Blakiston Company, Phila., 1947; pp. 295–97.

Babor, J. A. et al.: General College Chemistry; Thomas Y. Crowell Co.; N.Y., 1940; p. 80.

OSCAR R. VERTIZ, Primary Examiner

G. O. PETERS, Assistant Examiner